S. DENNIS, Jr.
Side-Hill Plow.
No. 19,496. Patented Mar. 2, 1858.
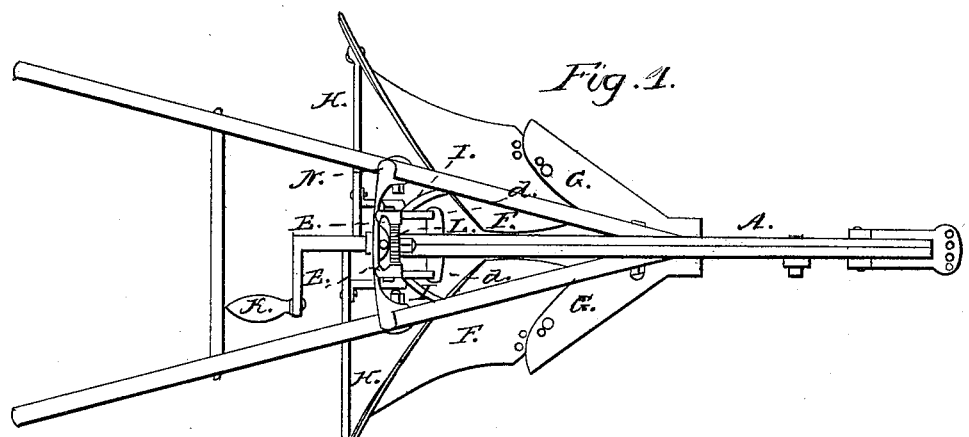
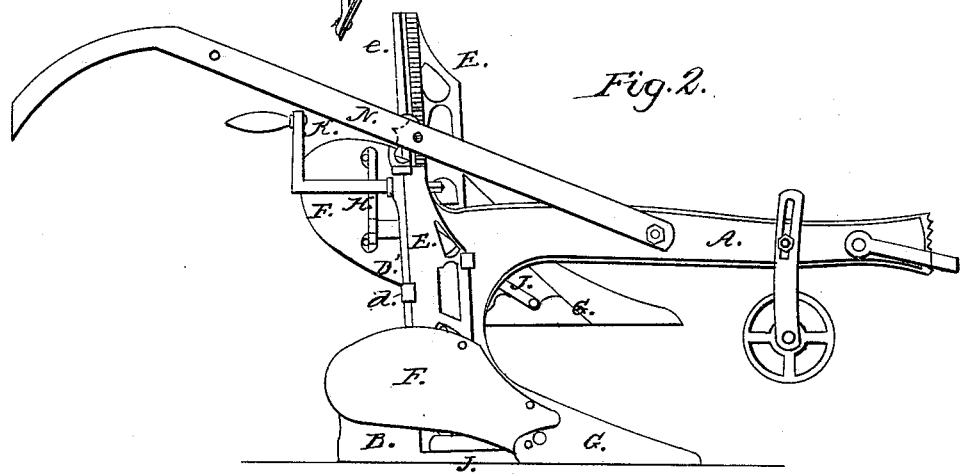
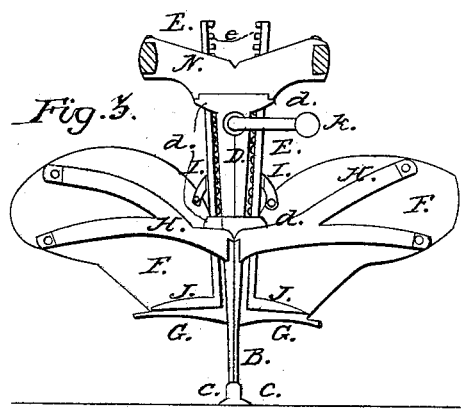

UNITED STATES PATENT OFFICE.

SAML. DENNIS, JR., OF JASPER, NEW YORK.

IMPROVEMENT IN HILLSIDE-PLOWS.

Specification forming part of Letters Patent No. 19,496, dated March 2, 1858.

*To all whom it may concern:*

Be it known that I, SAMUEL DENNIS, Jr., of Jasper, in the county of Steuben and State of New York, have invented a new and useful Improvement in Hillside-Plows, the construction and operation of which I have described in the following specification and illustrated in the accompanying drawings with sufficient clearness to enable competent and skillful workmen in the arts to which it pertains or is most nearly allied to make and use my invention.

My said invention consists in the improved mode of construction hereinafter described, by which I am enabled by the use of two mold-boards and shares to secure the form most desirable in both, without reference to their operation in more than one position.

In the accompanying drawings, Figure 1 is a plan of my improved plow. Fig. 2 is a side elevation, showing one of the mold-boards and shares in working position and the other raised to pass over the land. Fig. 3 is a rear view or rear elevation, showing both mold-boards and shares partly raised. The upper part of the handles is in this view omitted.

It is a well-known fact among farmers that it is difficult to turn a furrow uphill, and for this reason the usual mode adopted on level ground of plowing round a land has to be abandoned in plowing upon steep sides of hills. Formerly the work was done by driving across the field as nearly horizontally as possible and turning a furrow in a downhill direction. In returning the position of the plow to the hill was reversed, and as a furrow could not be thrown up the hill, the time and labor expended in returning to the place of beginning was a total loss. This led to the invention of plows with a reversible mold-board and share, which enabled the operator to turn a furrow either way with the same plow by reversing the position of these parts. This arrangement, while it was a great improvement upon the old way, still had its objections, one of which was that the mold-board and share had to be so modified in their form as to answer in two positions, and consequently did not admit of being made in the most efficient form for either of the positions in which it was to operate. In my improved plow two mold-boards and shares are used, one to turn a furrow to the right and the other for turning a furrow to the left-hand side, and these are so connected by gearing that when one is lowered into its operating position, the other is raised so as to be clear of the land.

A is the beam of the plow, the forward portion of which is made generally like some of the cast-iron plow-beams now in common use. It and the landside B are cast in one piece, except a bottom plate to form the laterally-projecting flanges *c c* of the landside. This is cast in a separate piece and attached. A standard, yoke, bracket, or hanger, D, rises from the rear end of the beam A to support the slides E, upon which the mold-boards F and shares G are hung. To allow these shares G to slide past each other the slides E diverge as they rise, by which the mold-boards and shares are thrown out from the center sufficiently to just clear each other at their place of meeting. This inclination of the slides is shown in Fig. 3. Each share is firmly attached to its mold-board, and both shares and mold-boards are attached to the slides by the braces H, I, and J. There is a V-shaped groove in the under side of each share, near its land-edge, which fits upon a corresponding V-shaped forward end of the landside of the plow, by which arrangement the share is supported under the severe strain to which it is subjected.

The mold-board is supported partly by the means above described and partly by the braces I and J, the latter of which is notched at the end, and fits with a shoulder upon the the top of the landside, so as to effectually support the heel of the mold-board against side pressure. The back end of the share, when in working position, fits against a shoulder upon the landside, so as to prevent its being driven back by pressure. The tendency of the pressure upon the share and mold-board being, while operating, strongly downward, will, under ordinary circumstances, keep them down upon the landside; but should in any case other appliances become necessary, a pawl may be attached to work into one of the racks *e*, which form a part of the slides E. These slides are kept in position by lugs *d*, attached to the standard D, and are operated by turning the crank K, which carries the pinion L. This pinion on being rotated moves one of the slides up and the other down at the same time, as an inspection of the construction and arrangement of the parts will show. The forward ends of the handles are attached to the beam, as shown in Figs. 1 and 2, and they are supported farther back by the yoke N, which is attached to the standard D for that purpose.

In plowing with the left hand toward the land the parts are in the position represented in Fig. 2, the plow not at work being raised sufficiently high to pass over the land without touching it. On turning in the opposite direction, the furrow being required to be laid toward the left hand, the position of the parts is reversed by the means before described, and the plow shown in Fig. 2 as being raised is brought down to the working position, and the other raised to pass over the unplowed ground. This arrangement allows the mold-board and share to be made of the most efficient form for the position for which they are made, without reference to any other position, and yet they are easily and readily shifted to bring those alternately required into working position, and while in that position are well and fully supported.

This plow, though particularly and especially intended for hillside-plowing, may yet be used with advantage on level ground, as it enables the plowman to continue all his furrows to the end of the field without any loss of time by so doing, to commence at one side of the field and work constantly toward the other, and has the further advantage of dividing the labor equally between the oxen or horses which form the team, as by the change which is made at the end of every furrow each is alternately placed in the furrow and the other on the land.

The lower part of the landside, or at least so much of it as forms the flanges c c, is removable, and may be replaced when worn out.

The particular improvement which constitutes my said invention, and which I claim as having been originally and first invented by me, is—

The combination of two mold-boards and shares with a single stationary landside in the construction of a hillside-plow, substantially as described, for the purpose stated.

SAMUEL DENNIS, Jr.

Witnesses:
SUMNER SARGENT,
HENRY C. PRENTICE.